Aug. 1, 1950
P. S. DENNING
2,517,090
METHOD OF MOLDING MAGNESITE PRODUCTS
Filed Nov. 9, 1946
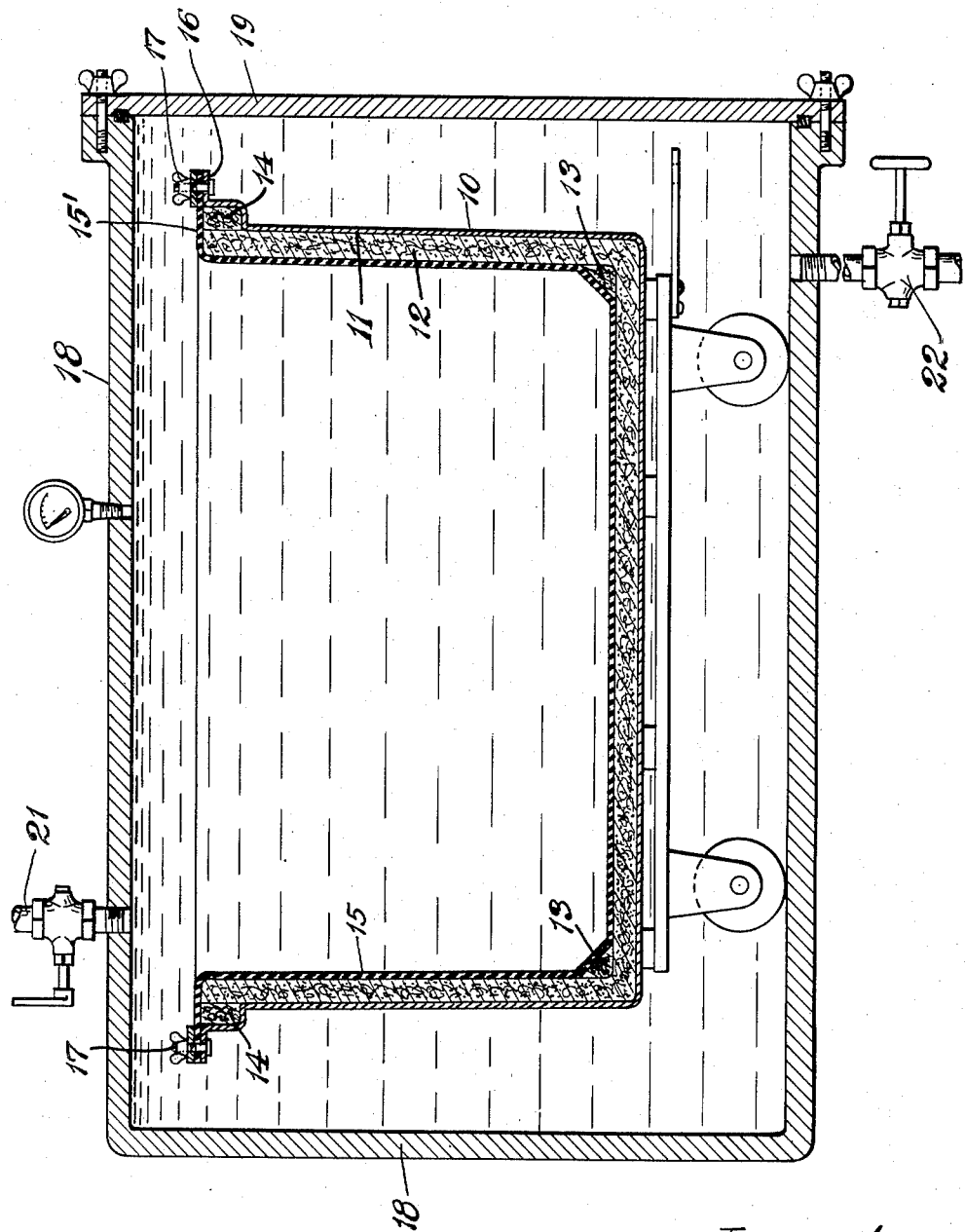
Inventor
Paul S. Denning
by Roland C. Rehm
Attorney.

Patented Aug. 1, 1950

2,517,090

UNITED STATES PATENT OFFICE 2,517,090

METHOD OF MOLDING MAGNESITE PRODUCTS

Paul S. Denning, Joliet, Ill., assignor to F. E. Schundler & Co., Inc., Joliet, Ill., a corporation of Illinois Application November 9, 1946, Serial No. 708,849

4 Claims. (Cl. 18—47.5)

This invention relates to a method of manufacturing molded magnesite products, and particularly products of relatively large size.

Among other objects the invention aims to provide a method by which large sized molded magnesite products of improved quality and strength may be made easily and inexpensively.

The nature of the invention may be readily understood by reference to one illustrative product and its method of manufacture shown in the accompanying drawing and described in the following specification.

In said drawing the figure is a longitudinal section somewhat diagramamtic in character illustrating a product and its method of manufacture.

Magnesite cement, such as magnesium oxychloride and magnesium oxysulphate cements, have long been used as building materials for floors, stucco, decorative tile, etc. For molded articles, particularly when the mold is expensive, the relatively slow setting time has been an objection. I have discovered a method for fabricating molded magnesite articles with inexpensive molds and in much less time than has heretofore been required. This is particularly advantageous where the molded article is large and the space occupied by the molds themselves is large. For example, molded articles such as vaults and caskets may advantageously be made by my method. These are illustrative of large molded articles, but it will be understood that the invention is not limited to any specific class of articles.

According to the invention an inexpensive and light mold is fabricated from thin sheet material such as sheet metal. Such a mold is represented by the box-like structure 10 whose inner surface 11 is the molding surface. A mold of this type is designed to mold box-like articles such as caskets wherein the exterior surface of the article takes the form of the mold. A box-like mold of this type if integral, is given sufficient draft to permit removal of the molded article. When the molded shape does not permit this, the mold may be made in two or more parts, as is customary for articles of complex shapes. In the illustrative method a cementitious material is applied in a layer 12 of the desired thickness to the face of the mold which preferably has been coated with an appropriate parting material to prevent adhesion of the cement directly to the mold surface. Oily or greasy substances are suitable for parting materials. These advantageously are applied dissolved in a volatile solvent which on evaporation leaves a very thin film of oil or grease on the mold surface. One such preparation is a solution of castor oil in denaturated alcohol.

The cementitious layer is advantageously reinforced with fiber or liker einforcement to permit reduction in wall thickness and weight. When properly reinforced the inherent strength of magnesite cements of this type permits reduction in wall thickness to ⅜ or ¼ of an inch with adequate strength. Preferably the fiber is incorporated in the cement by using a highly porous blanket or felt (formed for example from waste sisal or hemp fiber) whose uncompressed thickness may be of the order of ¼ to ½ inch. Material of this character made from waste rope or hemp fiber is available on the market. Preferably the "blanket" is first cut into such pieces as will properly line the mold with a sufficient overlap at the joints to provide strength. In a simple box-like mold one blanket sheet may be employed to cover two opposite sides and the bottom of the mold. Separate end pieces may be used to cover the other sides of the mold, adequately overlapping the first piece at the joints.

The cement is advantageously applied by immersing and saturating the blanket pieces in a slurry of the cement and wringing or pressing out the excess slurry. The impregnated blanket pieces are then applied to the mold surfaces and overlapped at the joints as aforesaid. Other sheet fibrous material such as burlap may be used in place of the thick porous blanket material. A plurality of layers of thinner material such as burlap may be used to build up adequate wall thickness. Although the material as applied to the mold may seem porous and lacking adequate cement, when the same is compressed as presently described there will be a sufficient surplus of cement not only to form a solid fiber reinforced wall but to provide excess cement for outer or surface layers susbtantially free from fiber on the inner and outer faces of the wall. Thicker outer cement layers may be formed by preliminary application as by spraying, of a layer of cement to the mold surface, and similarly applying cement to the saturated blanket after application of the latter to the mold.

Additional reinforcement where required, e. g. at corners, may be applied in the form of fibrous strips or fillets 13 saturated with cement. These are laid directly against the previously applied cementitious layer. Edge strips 14 to reinforce the edge of the article may be applied either inside the layer or as here shown, outside the layer. Also wood or other nailing strips (not shown) may be applied wherever desired directly against the cementitious layer and plastered in place with cement if necessary.

One suitable cement may comprise 75% magnesium oxide and 25% filler such as 140 mesh silex. In making the magnesium oxychloride cement the magnesium chloride solution may advantageously be 24° Baumé strength mixed with dry magnesite in the ratio of 1.25 cc. of magnesium chloride solution per gram of dry mix. This ratio will provide a slurry of heavy cream-like consistency which will readily penetrate the fiber reinforcement and yet permit easy removal of excess slurry after saturation simply by wringing out or compressing the fibrous blanket. The ratio of cement to inert filler may of course be widely varied depending on character of cement desired. Furthermore the nature of the filler may be varied.

If magnesium oxysulphate cement be used, magnesium sulphate solution replaces the magnesium chloride.

To accelerate the setting of the cement, after application to the mold as aforesaid, it is then simultaneously heated and compressed as next described. After completion of the article in the mold, the interior surface of the cementitious layer is covered with an impervious flexible and elastic cover or lining 15 such as rubber or a rubber substitute. In the present case such cover is a flexible mold lining of rubber or the like which lies against the cementitious layer and is sealed at its edges to the mold. As here shown the lining is provided with margins 15' which overlie the flanges 16 on the mold and against which the margins 15' are clamped (by bolts 17 or other clamping means) to seal the article inside the mold. Thereafter pressure and heat are applied to all surfaces (inside and out) of the mold. This is advantageously effected by placing the mold into a pressure chamber 18 and filling the same with hot water. After fastening the cover 19 pressure is applied to the chamber through line 21. The water not only serves as a heat reservoir, conveying heat quickly to the cement but applies and equalizes pressure thereon without substantially stressing the mold. The latter therefore may be made cheaply of light gauge sheet metal such as 16 to 18 gauge, or whatever strength is necessary to adapt the mold for handling. No surplus strength is required on account of the pressure applied in the chamber, since the latter reaches all surfaces of the mold and exerts pressure only on the cementitious article.

The pressure applied thoroughly bonds the overlapping layers at joints as well as reinforcing inserts and the like to the body of cement.

The temperature and pressure applied may vary considerably. It is possible by using water as a heating and pressure applying agent to vary the temperature independently of the pressure and vice versa. I have found that water of about 130 to 160° F. and pressures of 50 to 150 lbs. per square inch, produce setting of the cement in a very short time without impairment in the strength of the cement. Generally pressures should increase with the temperatures. Indeed application of heat without application of pressure is likely to produce a weak and inferior product.

By using water it is possible not only to supply adequate heat to the cement (by reason of the high specific heat of the water) but to apply pressure immediately on filling of the chamber. Elaborate heating means is unnecessary since the water itself carries sufficient heat for setting of the cement without addition of heat thereto inside the chamber.

At the end of the setting cycle, the water is drained from the chamber through an appropriate discharge (here represented by valve 21) after which cover 19 is removed. The mold is then disassembled and the article removed.

For articles wherein the interior surface is molded, the fiber reinforced cementitious material is applied to the exterior of the mold and the rubber lining is laid on the exterior surface of the cementitious layer and sealed as above described to the mold. Such a mold may also be flimsy and weak, since the pressure thereon is equalized and concentrated only on the cementitious layer itself. Where a sectional mold is required because of the shape of the article molded or for any other reason, leakage of water into the molding space is prevented by appropriate sealing means over the joints in the mold. For example, a flexible rubber envelope may be used to cover and seal the joints.

Obviously the invention is not limited to the details of the illustrative article nor its method of manufacture. Moreover it is not indispensible that all features of the invention be used conjointly since various features may be used to advantage in different combinations and sub-combinations.

Having described my invention, I claim:

1. The method of making molded magnesite products which comprises substantially saturating a porous blanket-like sheet with a slurry of magnesia cement of the class consisting of magnesium oxychloride and magnesium oxysulphate cement, removing excess slurry, applying the sheet to a mold surface to provide a cementitious layer, covering said layer with a flexible impervious cover, placing the mold in a pressure chamber, filling the chamber with hot water, and applying pressure to the hot water to heat and compress the said layer, there being sufficient slurry remaining in the porous sheet that when the latter is compressed as aforesaid there will be a sufficient surplus of cement to provide an outer layer of cement substantially free of fiber.

2. The method of making molded magnesite products which comprises substantially saturating a porous blanket-like sheet with a slurry of magnesia cement of the class consisting of magnesium oxychloride and magnesium oxysulphate cement applying the sheet to a mold surface to provide a cementitious layer, covering said layer with a flexible impervious cover, placing the mold in a pressure chamber, filling the chamber with hot water at a temperature of 130° F. to 160° F., and applying pressures of from 50 to 150 lbs. per square inch to said water to heat and compress the said layer.

3. The method of making molded magnesite products which comprises substantially saturating a porous blanket-like sheet with a slurry of magnesia cement of the class consisting of magnesium oxychloride and magnesium oxysulphate cement, removing surplus slurry, applying the sheet to a mold surface to provide a cementitious layer, covering said layer with a flexible impervious cover, placing the mold in a pressure chamber, filling the chamber with hot water heated to a temperature of about 130° F. to 160° F., and applying pressure to said water to heat and compress said layer.

4. The method of making compressed molded magnesite products which comprises substantially saturating a porous blanket-like sheet with a slurry of magnesia cement of the class consisting of magnesium oxychloride and magnesium oxysulphate cement, wringing the sheet to express surplus slurry, applying said sheet to a relatively light weight and flimsy mold, covering the sheet thus applied with a light impervious cover and sealing the same to the mold to prevent entrance of fluid into the interior of the mold, placing the mold in a pressure chamber, surrounding the mold with heated water of a temperature of 130° F. to 160° F., and applying pressure to the water to heat and compress the material in the mold.

PAUL S. DENNING.

REFERENCES CITED

The following references are of record in the file of this patent:

UNITED STATES PATENTS

| Number | Name | Date |
|---|---|---|
| 2,353,996 | Cooke et al. | July 18, 1944 |
| 2,362,672 | Sloan | Nov. 14, 1944 |
| 2,367,779 | Hull | Jan. 23, 1945 |